United States Patent
Lazaridis et al.

(10) Patent No.: US 9,411,863 B2
(45) Date of Patent: Aug. 9, 2016

(54) DEVICE AND METHOD FOR DISTRIBUTED DATABASE KEYWORD SEARCHING

(71) Applicant: BlackBerry Limited, Waterloo (CA)

(72) Inventors: Mihal Lazaridis, Waterloo (CA); Joseph Eytan Benedek, Thornhill (CA); Karthigesu Niranjan, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/847,464

(22) Filed: Sep. 8, 2015

(65) Prior Publication Data

US 2015/0379095 A1 Dec. 31, 2015

Related U.S. Application Data

(63) Continuation of application No. 13/634,712, filed as application No. PCT/CA2011/050612 on Sep. 29, 2011, now Pat. No. 9,141,701.

(51) Int. Cl.
*G06F 17/30* (2006.01)
*G06F 3/14* (2006.01)
*G06F 17/20* (2006.01)
*H04L 29/08* (2006.01)
*H04M 1/725* (2006.01)
*G06F 9/445* (2006.01)
*H04M 1/2745* (2006.01)

(52) U.S. Cl.
CPC ............ *G06F 17/30554* (2013.01); *G06F 3/14* (2013.01); *G06F 8/61* (2013.01); *G06F 8/65* (2013.01); *G06F 17/20* (2013.01); *G06F 17/30* (2013.01); *G06F 17/30477* (2013.01); *G06F 17/30864* (2013.01); *H04L 29/08* (2013.01); *H04M 1/72519* (2013.01); *H04M 1/274558* (2013.01)

(58) Field of Classification Search
CPC ........................... G06F 17/30; G06F 17/30477
USPC ......................................... 715/810
See application file for complete search history.

(56) References Cited

U.S. PATENT DOCUMENTS

2009/0240672 A1* 9/2009 Costello ................. G06Q 30/02
2013/0055295 A1* 2/2013 Dayka ..................... G06F 21/53
719/328

OTHER PUBLICATIONS

EPO, Examination Report relating to EP Patent Application No. 11873224.7 dated May 20, 2016.

* cited by examiner

*Primary Examiner* — Andrea Leggett
(74) *Attorney, Agent, or Firm* — Rowand LLP

(57) ABSTRACT

A method performed by a mobile communications device, including: populating a central database on the device with a title for each of a plurality of software modules installed on the device and associating each title with its software module; populating the central database with at least one keyword associated with each of the plurality of software modules and associating each keyword with its software module; receiving at the device a search query; displaying at the device a search result identifying at least one of the software modules installed on the device having either a title or one or more associated keywords matching the search query; and in response to receiving at the device a selection of a software module identified in the search result, activating the selected software module.

20 Claims, 9 Drawing Sheets

DEVICE AND METHOD FOR DISTRIBUTED DATABASE KEYWORD SEARCHING

CROSS REFERENCE TO RELATED APPLICATION

This application is a continuation of application Ser. No. 13/634,712 which was a 35 U.S.C. §371 National Stage Entry application of International Application No. PCT/CA2011/050612, filed Sep. 29, 2011, which designates the U.S. The contents of these applications are incorporated herein by reference.

TECHNICAL FIELD

The present disclosure relates to mobile communication devices and methods and more particularly, to methods and devices for providing keyword searching in distributed databases.

BACKGROUND

Mobile communication devices may run many different software applications having different capabilities, or allowing different actions to be performed. These software applications may also contain different types of information, such as personal contact information in an address book application and message information in a messaging application.

Communication devices often include a display which is associated with a graphical user interface (GUI) and one or more input mechanisms for navigating the graphical user interface. The GUI and input mechanisms typically allow a user to locate and launch a specific software application or to display a specific piece of information associated with a software application. Where a user of a communication device would like to launch an application or perform a specific action associated with the application, they often navigate the graphical user interface in order to select the application or to select the action within the application once it has been launched. For example, a user may select a "Compose New Message" option within an e-mail messaging application to compose a new e-mail message. Similarly, where a user of a communication device would like to locate and display a piece of information associated with an application, he or she will often navigate the graphical user interface in order to select the piece of information within the application. For example, a user may select a specific received message within the Inbox of an e-mail messaging application to view the content of that message.

As the number of different software application capabilities resident on a given device increase in number, and the information resident within those applications increases in both amount and variety, users may encounter difficulty in navigating the device's software environment to locate a specific capability of the device or a specific piece of information associated with an application. The process of navigating the graphical user interface in order to select the desired application, action, or piece of information may be slow and may, as a result, consume system resources such as battery resources, memory resources and display resources.

Thus, there exists a need to provide improved methods, systems and devices for permitting navigation of applications, actions, and information.

BRIEF DESCRIPTION OF THE DRAWINGS

It will be noted that throughout the drawings and description similar features are identified by the same reference numerals.

DETAILED DESCRIPTION OF EXAMPLE EMBODIMENTS

Figure 1:
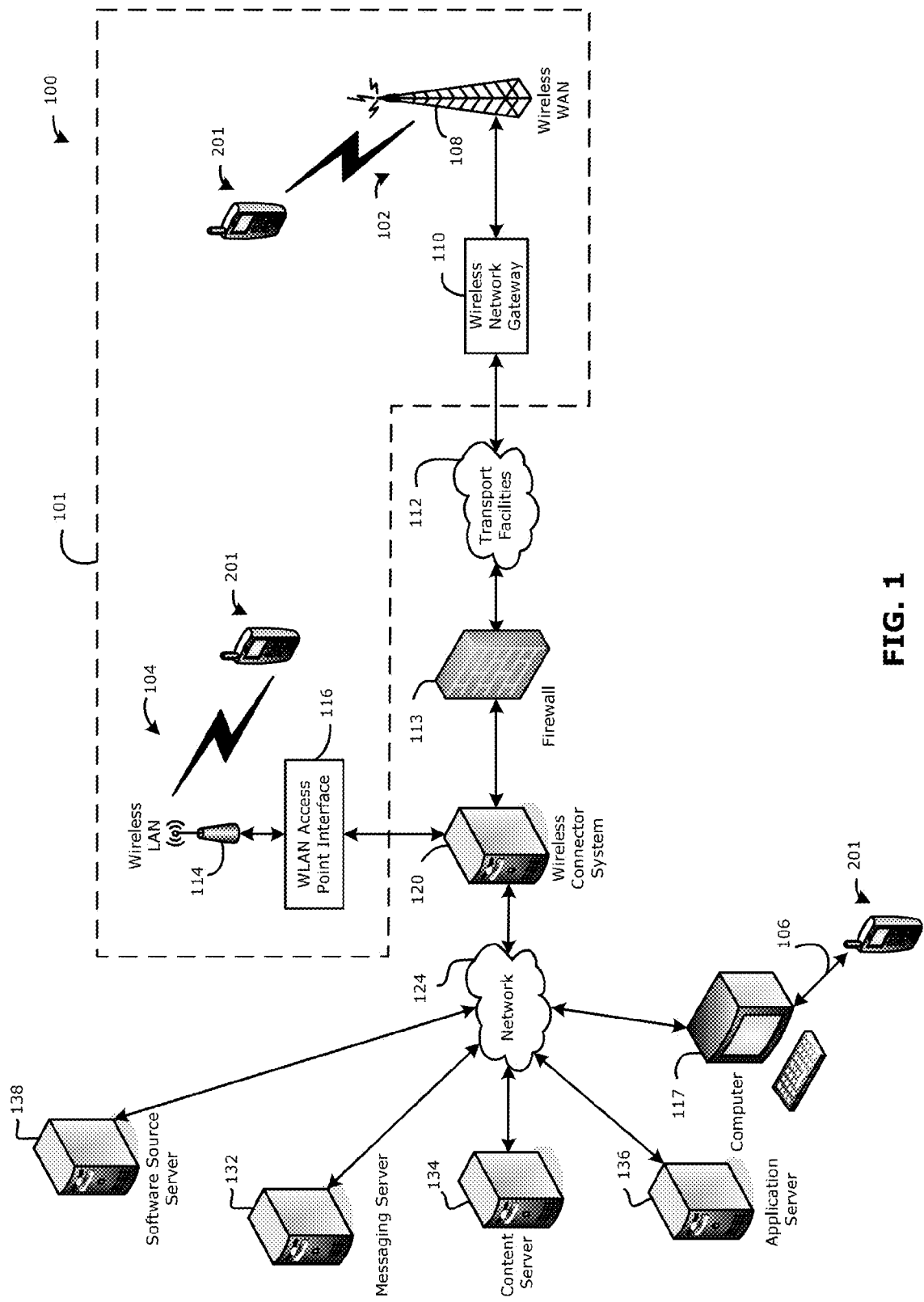
FIG. 1 is a block diagram illustrating a communication system in which example embodiments of the present disclosure can be applied.

The present disclosure describes a method performed by a mobile communications device, including: populating a central database on the device with a title for each of a plurality of software modules installed on the device and associating each title with its software module; populating the central database with at least one keyword associated with each of the plurality of software modules and associating each keyword with its software module; receiving at the device a search query; displaying at the device a search result identifying at least one of the software modules installed on the device having either a title or one or more associated keywords matching the search query; and in response to receiving at the device a selection of a software module identified in the search result, activating the selected software module.

In another aspect, the present disclosure describes a mobile communication device, including: a memory comprising a central database and a plurality of installed software modules; at least one user input device; at least one user output device; and a processor configured to: populate the central database on the device with a title for each of the plurality of software modules installed on the device and associate each title with its software module; populate the central database with at least one keyword associated with each of the plurality of software modules and associate each keyword with its module; receive a search query via the at least one user input device; communicate via the at least one user output device a search result identifying at least one of the software modules installed on the device having either a title or one or more associated keywords matching the search query; and in response to receiving via the at least one user input device a selection of one of the software modules identified in the search result, activate the selected software module.

In yet a further aspect, the present disclosure describes a system for initiating actions on a mobile communications device, including a mobile communications device adapted to download and install software installation packages via a communication link Each of the software installation packages includes a software module installable on the mobile communication device and executable by a processor of the mobile communication device and metadata indicating at least a title and one or more keywords associated with the software module. Installing software installation packages includes, for each of the software installation packages, populating a central database of the mobile communication device with at least one keyword associated with the software module and associating each keyword with the module. The mobile communications device includes at least one user input device and one output device, and a processor configured to: receive a search query via the at least one user input device; communicate via the at least one output device a search result identifying at least one of the software modules installed on the device having either a title or one or more associated keywords matching the search query; and in response to receiving via the at least one user input device a selection of one of the software modules identified in the search result, activate the selected software module.

Other example embodiments of the present disclosure will be apparent to those of ordinary skill in the art from a review of the following detailed description in conjunction with the drawings.

Example embodiments of the present disclosure are not limited to any particular operating system, mobile device architecture, server architecture, or computer programming language.

The present disclosure describes, among other things, a mobile communication device which is configured to provide keyword searching.

System Overview

In order to facilitate an understanding of one possible environment in which example embodiments described herein can operate, reference is first made to FIG. 1 which shows, in block diagram form, a communication system 100 in which example embodiments of the present disclosure can be applied. The communication system 100 includes a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realized using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

A developer or distributor of software intended for installation on the device 201 may distribute such software packages via a software source server 138 accessible through the network 124. In some example embodiments, the device 201 may be able to access the software source server 138 directly through WWAN 104 or wireless WAN 102 and the network 124 to download and install software installation packages on the device 201. In other example embodiments, the host computer 117 may download software installation packages from the software source server 138, which can then be installed onto the device 201 through a link 106 with host computer 117 as described below. In some example embodiments, the device may only install software obtained via the content server 134, either directly through the network 124 or via the host computer 117. The content server 134 may in turn obtain the software from the developer via a software source server 138. Thus, in various example embodiments the software installation packages may originate at various sources and may be distributed to the device 201 through various channels.

The wireless connector system 120 provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, or application servers 136. Conversely, the wireless connector system 120 sends data packets received, for example, from the messaging server 132, content server 134, or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134, and application server 136.

The network 124 may include a private local area network, metropolitan area network, wide area network, the public Internet or combinations thereof and may include virtual networks constructed using any of these, alone, or in combination.

A link 106 may be provided for exchanging information between the mobile communication device 201 and a host computer 117 connected to a network 124, such as the Internet. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and host computer 117. In one example embodiment, the link 106 is a USB connection to the mobile communication device 201. In at least some example embodiments, the link 106 is a Bluetooth™ connection.

The content server 134 is configured to deliver digital content to the host computer 117 upon request by the host computer 117. The content server 134 may, in at least some example embodiments, be a publicly accessible server which hosts digital content. The content server 134 is, in at least some example embodiments, a web server which delivers content using the Hypertext Transfer Protocol (HTTP) or another suitable protocol over the World Wide Web. The content server 134 may host one or more web pages or other digital content. The web pages may, in at least some example embodiments, provide an interface for accessing other digital content. For example, the web pages may include one or more links to other content, such as, for example, audio files, images, video files, etc.

Accordingly, the content server 134 is configured to serve digital content. The digital content may, in various example embodiments, include video files, audio files, documents, podcasts, e-books, web-pages, images such as photographs, icons, themes, applications, and/or games. Other types of digital content are also possible. The digital content may include any information which is published or distributed in a digital form. In some example embodiments, the content server 134 may also serve software installation packages for download and installation on the host machine 117 or the device 201.

The software source servers 138 may also operate in some embodiments according to one or more of the modes described above with respect to the content server 134. In some example embodiments, the software source server 138 provides applications or software installation packages to the content server 134 through a network connection (which may be through network 124 for example), such as an encrypted HTTP connection. In other example embodiments, the software source server 138 may provide software installation packages to the computer 117 or the device 201 directly through network 124.

The host computer 117 typically includes a controller having at least one processor (i.e., microprocessor) for controlling its operation, a communications subsystem connected to the processor for communicating with the communication system 100, a display screen or monitor connected to the processor, one or more user input devices such as a keyboard and mouse connected to the processor for sending user input signals to the processor in response to user inputs, a memory or storage element connected to the processor such as a hard disk drive (HDD), RAM, ROM and/or other suitable memory connected to the processor, and other suitable input and output devices as desired or required. The memory has data and instructions stored thereon for configuring the processor and host computer 117. Operating system software, software applications, and data used by the processor are stored in the memory. The software and data configure the operation of the host computer 117. Other features of the host computer 117 for implementing the processes and functions described herein will be appreciated by persons ordinarily skilled in the art.

Accordingly, the communication system of FIG. 1 permits devices 201 to communicate with one or more other devices using one or more communication technologies.

It will be appreciated that the above-described communication system is provided for the purpose of illustration only, and that the above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Example Mobile Communication Device

Figure 2:
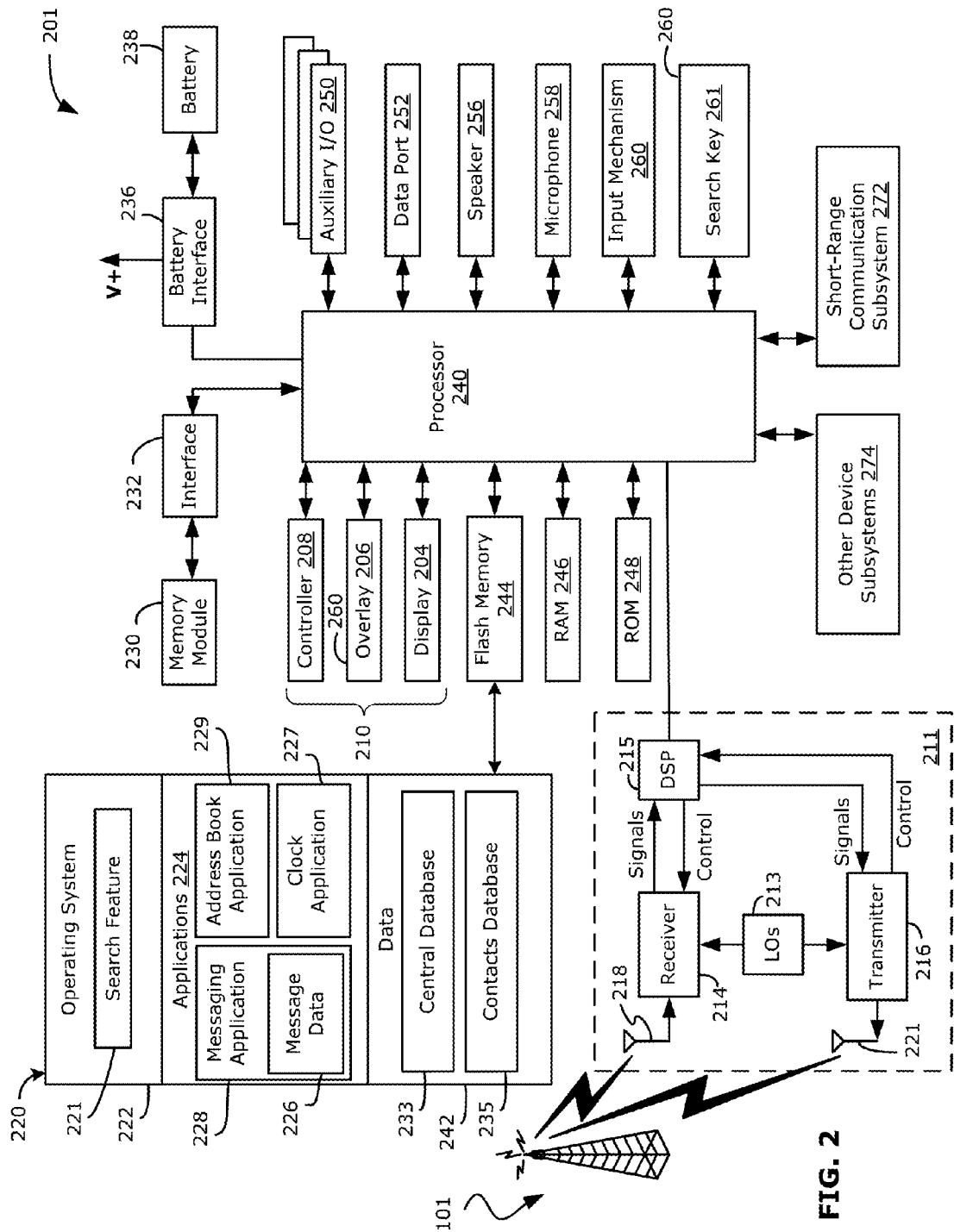
FIG. 2 is a block diagram illustrating a mobile communication device in which example embodiments of the present disclosure can be applied.

Reference is now made to FIG. 2 which illustrates a mobile communication device 201 in which example embodiments described in the present disclosure can be applied. The mobile communication device 201 is a two-way communication device having data and possibly also voice communication capabilities. The mobile communication device 201, in at least some example embodiments, has the capability to communicate with other computer systems; for example, via the Internet. Depending on the functionality provided by the mobile communication device 201, in various example embodiments the mobile communications device 201 may be a data communication device, a multiple-mode communication device configured for both data and voice communication, a smartphone, a mobile telephone or a PDA (personal digital assistant) enabled for wireless communication, or a computer system with a wireless modem. The mobile communications device 201 may also be referred to as a communication device 201, an electronic device 201, a mobile device 201 and, in some cases, as a device 201.

The mobile communication device 201 includes a controller including at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. That is, the communication subsystem 211 is configured to provide communication services using a plurality of communication technologies. For example, the device 201 may be equipped to communicate via any one or combination of: electronic mail (e-mail), text messaging, such as short message service messaging (SMS), multimedia messaging service (MMS), instant messaging, voice-based communications, social network based messaging, Device-to-Device based messaging, or facsimile. Other communication technologies may also be employed.

The processor 240 interacts with additional device subsystems. In some example embodiments, the mobile device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 act as an input mechanism 260 to provide a touch-sensitive input device. The processor 240 also interacts with the touch-sensitive overlay 206 via the electronic controller 208. In other example embodiments, the display 204 may not be a touchscreen display. Instead, the mobile device 201 may simply include a non-touch display and one or more input mechanisms 260, such as, for example, a depressible scroll wheel or other control keys.

The processor 240 interacts with additional device subsystems including flash memory 244, random access memory (RAM) 246, read only memory (ROM) 248, auxiliary input/output (I/O) subsystems 250, data port 252 such as serial data port (for example a Universal Serial Bus (USB) data port), speaker 256, microphone 258, input mechanism 260, dedicated search button 261 (which may be a further input mechanism 260 on the device 201), short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which the mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP

215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

Example Software Modules and Data on the Device

The processor 240 operates under stored program control and executes software modules 220 stored in memory such as persistent memory; for example, in the flash memory 244. As illustrated in FIG. 2, the software modules 220 include operating system software 222 and software applications 224, such as a messaging application 228, address book application 229, and clock application 227. The software modules 220 further include a search feature 221, shown in FIG. 2 as part of the operating system 222 but present in some example embodiments as a stand-alone software application.

In at least some example embodiments, the messaging application 228, address book application 229, clock application 227, and search feature 221 each include instructions and data usable by processor 240 for providing a graphical user interface (GUI) allowing a user to use the various functions of the application or module as described below.

The messaging application 228 may be used to manage, display, receive, create, and send messages, such as e-mail messages. Messages sent and received by the device 201 may be stored as message data 226 in Flash Memory 244 and accessed by the messaging application. Each message in the message data 226 may include multiple data fields, such as a field identifying the sender, fields identifying recipients, fields identifying the times the message was sent and received, a field identifying the subject of the message, and one or more fields containing the content of the message.

Figure 3:
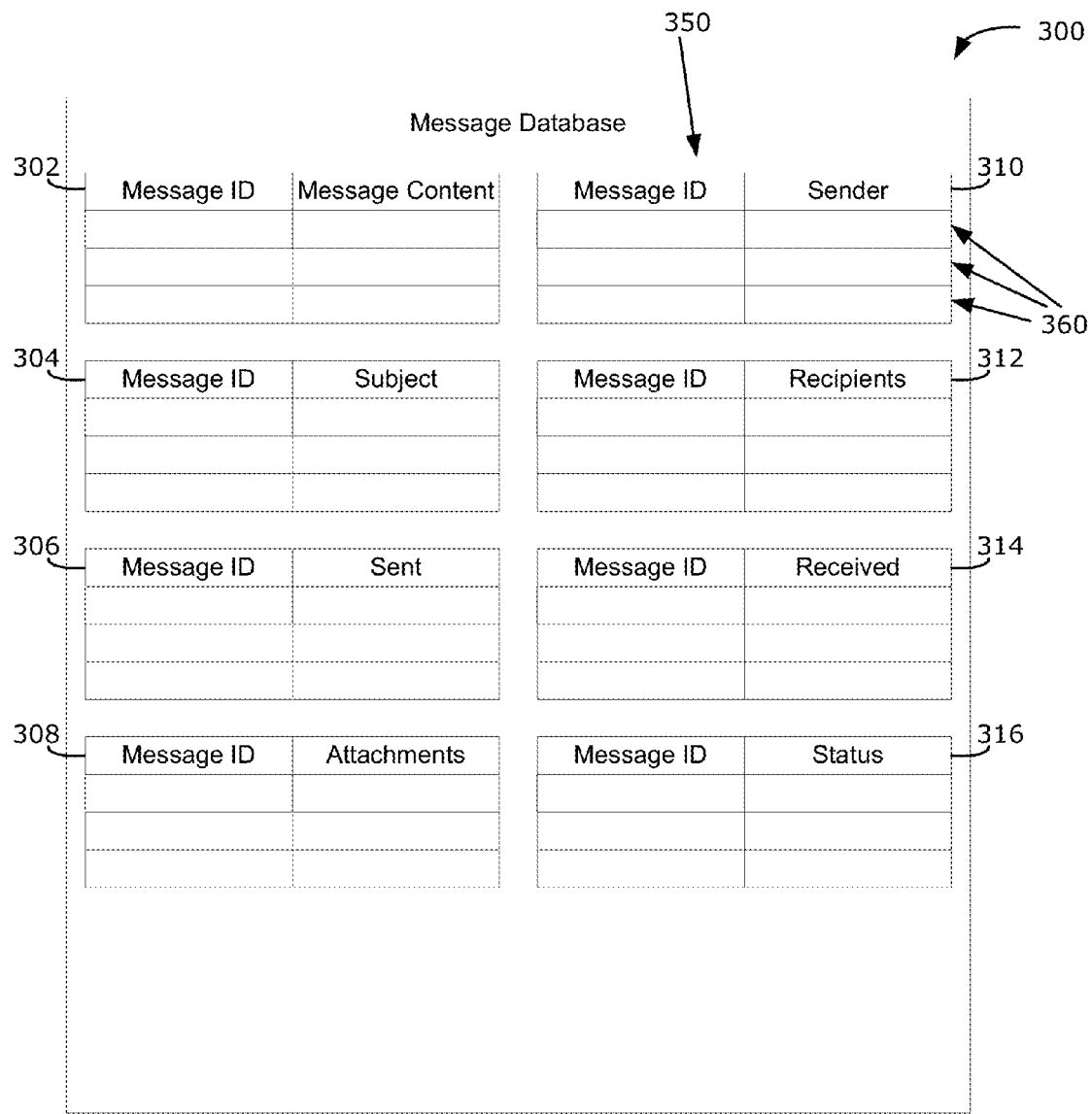
FIG. 3 is a block diagram showing a message database of a mobile communication device in accordance with example embodiments of the present disclosure.

The message data 226 may in some example embodiments be stored in whole or in part as a set of database tables associating one or more fields from each message with a message identifier, as well as a database table associating message identifiers with message content. FIG. 3 shows the structure of such a message database 300 containing the message data 226 according to an example embodiment. The message database 300 operates as a relational database, with multiple database tables each containing different fields related to the stored messages including message identifier fields used for cross-referencing between tables. The illustrated example embodiment has a message content table 302 containing the content of the stored messages, a subject table 304 storing the subject of each message, a time sent table 306 storing the send time of each message, an attachment table 308 storing the attachments of each message, a sender table 310 storing the sender of each message, a recipients table 312 storing the recipients of each message, a time received table 314 storing the receipt time of each message, and a status table 316 storing the status of each message (e.g., it is urgent, has it been read by the user, etc.). Other fields relating to sent, received, or draft messages could be included as additional tables or fields of the message database 300 in some example embodiments.

Each table in the example message database 300 also has a Message ID field 350 for indicating a unique message identifier for each record 360 in the table. These message IDs can be used to cross-reference table lookups.

Using a relational database structure with multiple cross-referenced tables may increase the efficiency of searches against a subset of message fields 360, although there may be tradeoffs in terms of storage space. A skilled practitioner would appreciate that the message database 300 or any of the other databases described herein could be implemented in any of a number of different configurations to implement the methods described herein.

The clock application 227 may be used to set and view the time and date. It may also, in some example embodiments, be used to set an alarm to alert the user at a specific date and time. To set the date, a user may activate the clock application 227, navigate the application's GUI to initiate a "Set Date" action, and then input the current date. To set an alarm, a user may instead select a "Set Alarm" action after activating the application, then input the desired date and time of the alarm. In addition to time keeping and alarm capabilities, the cloak application 227 may also implement other user selectable features such as a stop watch or countdown timer.

The address book application 229 may be used to manage, display, and initiate communication with personal contacts.

The address book application 229 maintains a contacts database 235 used for storing contacts associated with the device 201. The contacts may be associated with individuals and/or businesses, such as persons or businesses associated with one or more users of the device 201. By way of example, each contact includes identifying information, such as, for example, a name associated with the contact. For example, a contact may include a name of a person or business. Such information may be used to identify the contact.

At least some of the contacts also include address information associated with one or more communication methods. The one or more communication methods are methods which may be employed by the device 201 in order to communicate with the contact. For example, the address information may include a home telephone number, a mobile telephone number, a business telephone number, a facsimile telephone number, an electronic mail (email) address, a social network based messaging address (such as, for example, a user name associated with a social network) an instant messaging address, and/or a Personal Identification Number (PIN).

Figure 4:
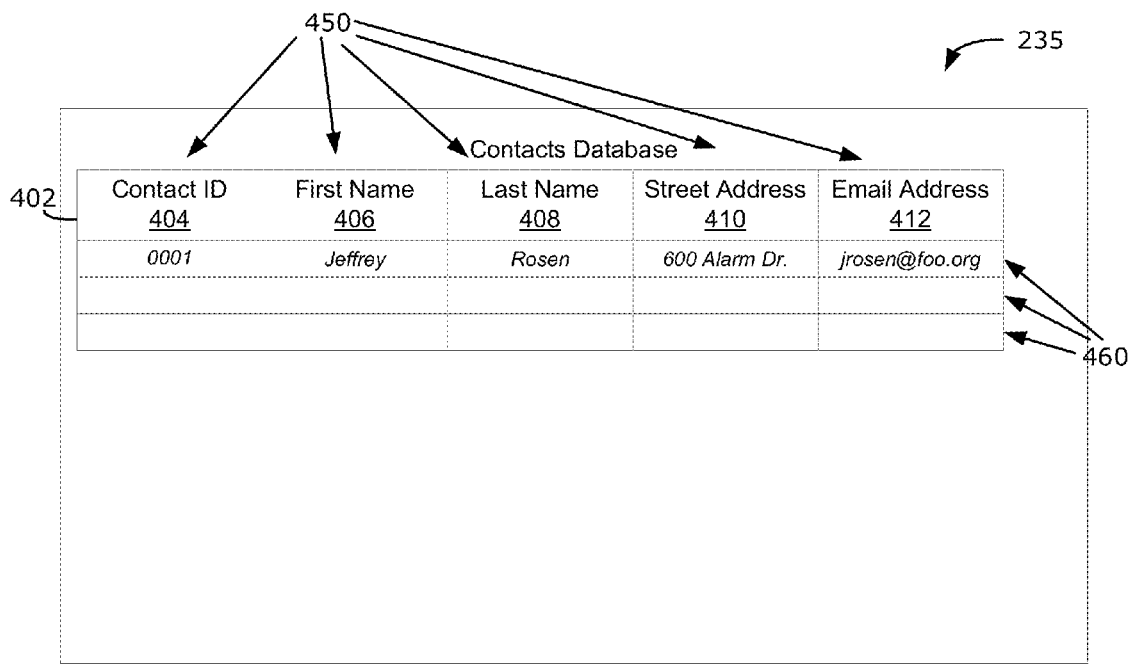
FIG. 4 is a block diagram showing a contacts database of a mobile communication device in accordance with example embodiments of the present disclosure.

An example contacts database 235 is shown in FIG. 4. In the illustrated example embodiment, the contacts database 235 consists of a single database table 402. The address information, identifying information or other information for a given contact are stored in one or more fields 450 of a contact record 460 in the table 402. In the illustrated example embodiment, the table includes fields for a unique identifier 404 identifying the contact, the contact's first name 406, the contact's last name 408, the contact's street address 410, and the contact's email address 412. Other example embodiments may include other fields, such as the various types of address information described above.

In some example embodiments, a user may add a new contact to the contacts database 235 by activating the address book application 229, navigating the application's GUI to select an "Add Contact" action, then inputting values for one or more fields 450 of the new contact record 460.

In some example embodiments, the functions described with reference to the address book application 229, messaging application 228, or clock application 227 may be split into multiple applications or modules, each performing a subset of the functions of the applications described above.

The various data types described in the example embodiments above are not limited to the example embodiments described. For example, while the message data 226 has been described in the example embodiments as including a message database 300 having multiple tables and stored within the messaging application 228 itself, other example embodiments may store the message data in a non-database format, or may use a single database table, or may store the data in the data area 242 of memory, or any combination thereof. Similarly, the contacts database 235 could be stored as multiple tables, or could be stored alongside or within the address book application 229, or could be stored in an ASCII format, such as one or more XML files. The term "database" as used within the context of this description refers to any data storage structure capable of storing records having values corresponding to different data fields.

Figure 5:
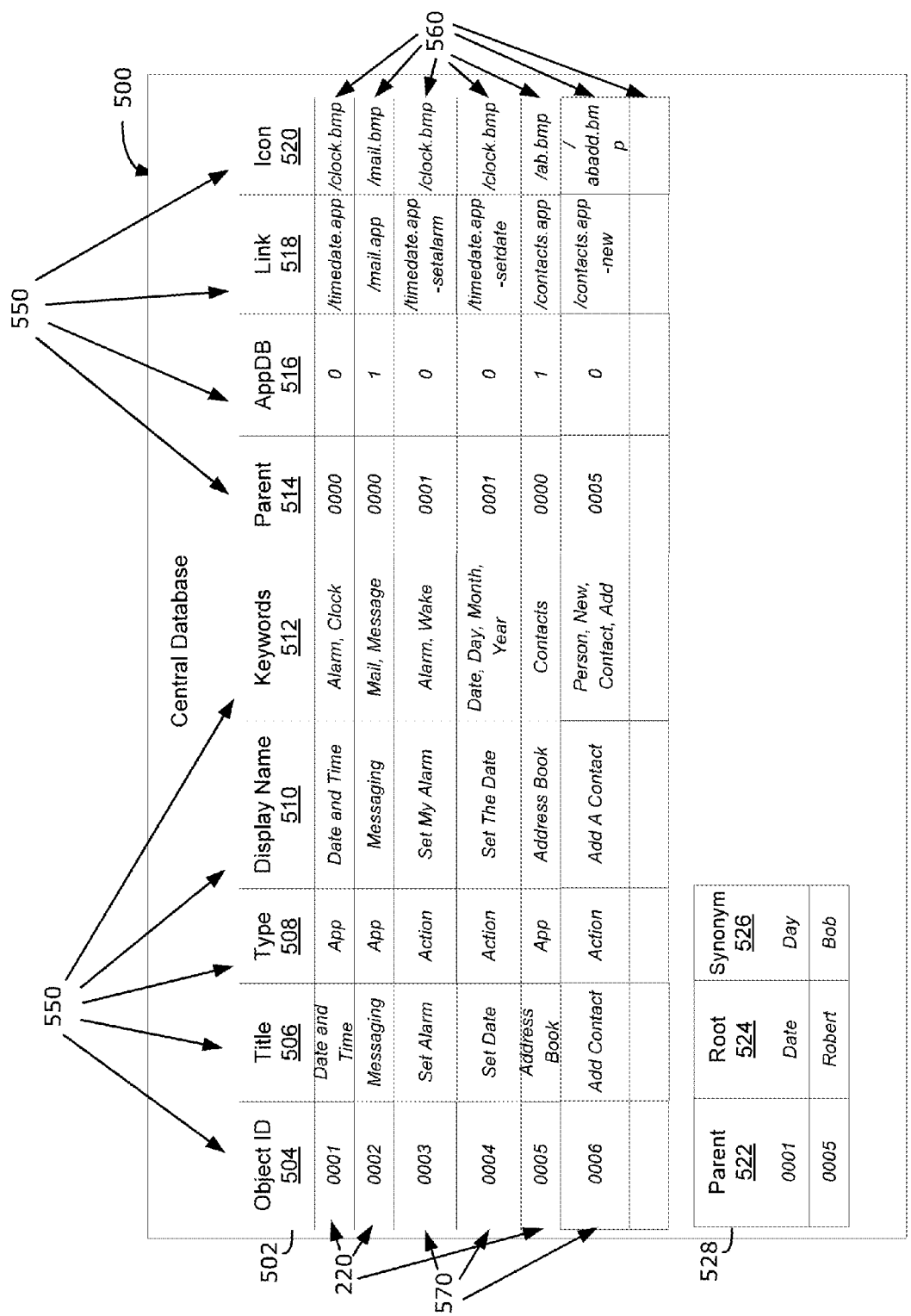
FIG. 5 is a block diagram showing a central database of a mobile communication device in accordance with example embodiments of the present disclosure.

The device 201 also maintains a central database (233 in FIGS. 2 and 500 in FIG. 5). The example central database 500 has a module and action table 502 containing database records 560 storing various data fields 550 of metadata regarding various modules 220 resident on the device 201 and actions 570 that can be performed by those modules 220. In the illustrated example embodiment in FIG. 5, the fields 550 included in the module and action table 502 include:

1. Object ID 504: An identifier uniquely identifying the record.
2. Title 506: A title for the module or action, which may be used in keyword searching in some example embodiments.
3. Type 508: Indicates whether the record pertains to a module (indicated as "app" in the type field) or an action.
4. Display Name 510: The name of the module or action as displayed in the GUI, for example when displaying the name of the module or action in a set of search results.
5. Keywords 512: The keywords associated with the module or action and used for matching against search queries. The illustrated example embodiment separates multiple keywords with commas by way of example only.
6. Parent 514: For actions, this field indicates the module which populated the record in the central database and with which it may, in some example embodiments, be visually associated when returned in a set of search results. The value stored in the illustrated examples is the Object ID of the parent module.
7. AppDB 516: Indicates whether the module or action has a module-specific database used in keyword searches. In the illustrated example, a value of "1" indicates that the module does have a module-specific database, while a value of "0" indicates that it does not.
8. Link 518: A set of instructions used to activate the module or action. In the illustrated example, the instructions include a text string which, when executed as a scripted instruction, runs a specific executable file stored within a directory structure of the device, possibly with one or more parameters provided to the executable.
9. Icon 520: Indicates the image to be used as an icon associated with the module or action in some example embodiments when it is displayed in a set of search results. In the illustrated example, the icon includes a text string indicating the file path and file name of an image file stored within a directory structure of the device.

In some example embodiments, the central database 500 also includes a table of synonyms 528. In the illustrated example embodiment of FIG. 5, each record in the synonym table 528 has three fields:

1. Parent 522: Indicates the object ID 504 of the module responsible for populating this record.
2. Root 524: A text string which has a synonym.
3. Synonym 526: A text string which is to be treated as synonymous with the root 524 for the purposes of keyword searching.

The synonym table 528 serves to expand the scope of the search feature 221 to encompass not only a literal search query submitted by the user, but also queries using synonymous or closely-related terms to those used in the literal search query. The operation of the synonym table 528 is described in greater details below in the context of the search feature 221.

Software Installation Packages

Figure 6:
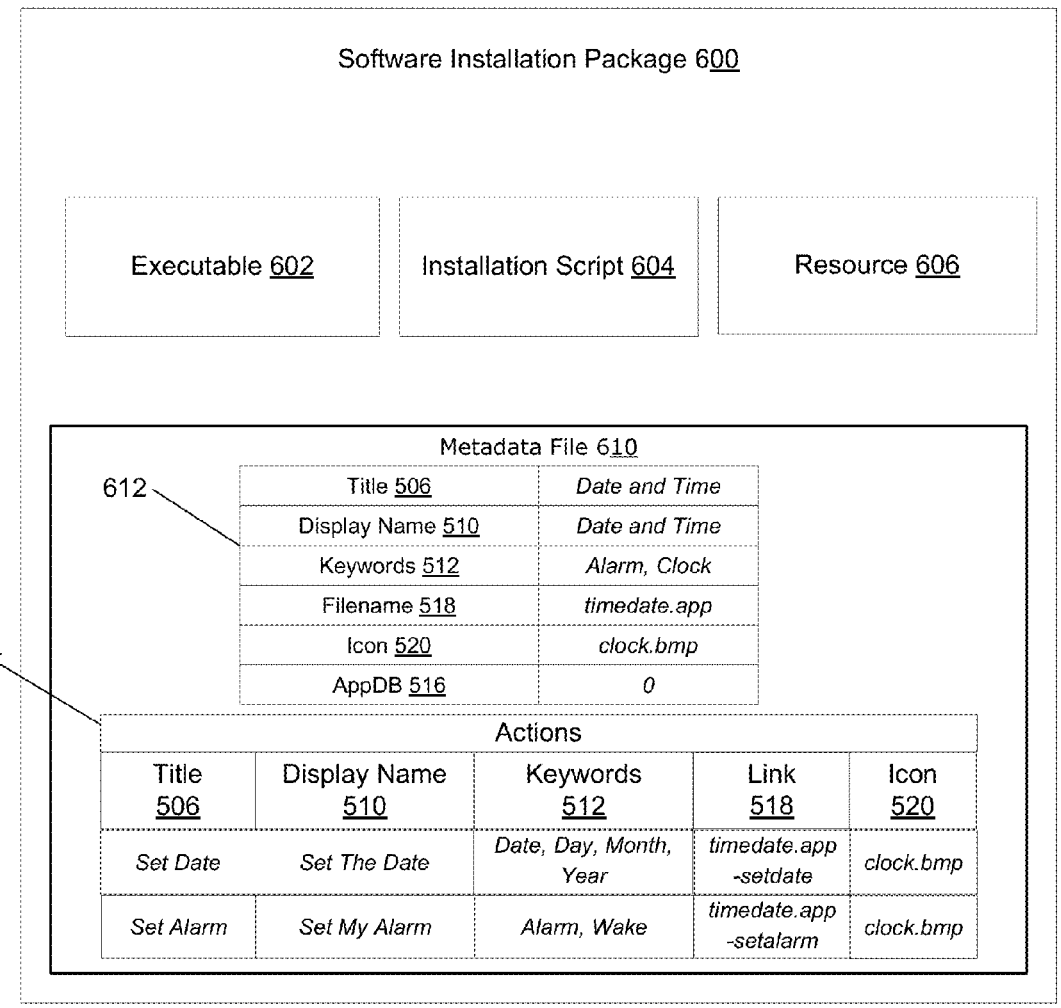
FIG. 6 is a block diagram showing a software installation package in accordance with example embodiments of the present disclosure.

The process of installing a software module on the device 201 begins with a software installation package being prepared by a developer, publisher, distributor, or other source of the software. An example software installation package 600 is shown in FIG. 6. Such a package 600 could include one or more executable files 602 which, when installed on the device 201, perform the functions of the software module 220 when run. In some example embodiments, these executables 602 are compiled binary files, while in other example embodiments they may be scripts executed by another application 224 or by the operating system 222.

A package 600 may also, in some example embodiments, include one or more non-executable resources 606, such as files containing text data, image data, video data, audio data, configuration data, or other data used by the module 220. In some example embodiments, these resources 606 may include one or more image files used as icons to represent the module 220 or various actions 570 performed by the module 220 in various GUI screens of the device 201.

In some example embodiments, a package 600 may include one or more installation scripts 604 containing instructions for installing the various components of the package 600 on the device 201. An installation script 604 may be a non-compiled script or a binary executable, or it may be a configuration file used by an installer module already present on the device 201. It contains information or instructions designating how the various components of the package 600 are to be installed and/or configured on the device 201.

In some example embodiments, the software package 600 may also include additional metadata. Some example embodiments may encapsulate this metadata in a metadata file 610. This metadata file 610 may include one or more data fields and values pertaining to the module 220 (of FIG. 2) being installed, such as a title 506, a display name 510, one or more keywords 512, a filename or link 518 identifying the executable(s) 602 to be run when activating the module 220, a field designating the icon 520 to be associated with the module 220, and/or a module-specific database field 516 designating whether the module 220 uses a module-specific database. The metadata may also specify one or more actions 570 that the software module 220 is capable of performing. Each action 570 may have additional metadata associated with it, such as one or more keywords 512 and/or a set of instructions to be issued to the software module in order to initiate the action 570. In the example embodiment shown in FIG. 6, these instructions take the form of a link 518 encoding parameters to be passed to the executable 602. Thus, in an example embodiment, the clock application described above may be packaged by a software distributor as a software installation package 600 containing:

1. the software module 220 itself as the executable file 602 "timedate.app";
2. information or instructions required for installing the software module, such as an installation script 604;
3. one or more resources 606, including the image file "clock.bmp"; and
4. a metadata file 610 containing the following metadata: the title "Date and Time", the keywords "Clock" and "Alarm" associated with the module, the action "Set Alarm", and the keyword "Alarm" associated with the action "Set Alarm". In some example embodiments, the metadata may also contain a module-specific database indicator 516, such as a flag, indicating that the module does not use a module-specific database. Conversely, an application such as the messaging application 228 described above would be packaged to include metadata indicating that it does use a module-specific database.

The central database 500 (of FIG. 5) is populated in some example embodiments as part of the installation of a software installation package 600. In an example embodiment, the installation script 604 of the software installation package 600 reads the module metadata 612 in the metadata file 610 and creates various records 560 in the central database 500 using the module metadata 612 contained therein. For example, the installation script 604 for the package illustrated in FIG. 6 might create an record 560 in the central database 500 for the module "Date and Time" being installed, with the various fields 550 of the record 560 in the central database 500—Title 506, Display Name 510, Keywords 512, Filename 518, Icon 520, and AppDB 516—populated by the data values shown in FIG. 6 (i.e., "Date and Time", "Date and Time", "Alarm, Clock", "timedate.app", "clock.bmp", and "0", respectively). Alternatively, as shown in the example embodiment in FIG. 5, one or more of these values may be altered based on the software environment in which the module is being installed: for example, if new module files are installed in the root directory "/", then this file path may be prefixed to the Filename 518 and/or Icon 520 values to produce, e.g., "/timedate.app" and "/clock.bmp". (In this example, the installation script 604 would also copy the files "timedate.app" and "clock.bmp", present as an executable 602 and resource 606 respectively in the software installation package 600, into the root directory "/" on the device 201.) Other values may be filled in by the installation script 604 based on context: for example, the field Type 508 would be set to "App" rather than "Action" in the illustrated example to indicate that "Date and Time" is a module 220, not an action 570.

Continuing with the illustrated example, in some example embodiments the installation script 604 would then create new central database records 560 for each action 570 indicated in the action metadata table 614 in the metadata file 610.

A module-specific database used by a specific software application 224 (of FIG. 2), such as the example message database 300 (of FIG. 3) used by the messaging application 228, may be populated at the time of installation, during use, or some combination thereof. For example, the message database 300 shown in FIG. 3 might have its basic structure copied from a software installation package 600 at the time that the messaging application 228 is installed, but it might not contain any message records until the application 228 is running and messages are created or received by a user. Other example modules 220 (of FIG. 2) having module-specific databases may populate one or more records at the time of installation, but may add more in use. Still others may fully populate the module-specific database at the time of installation.

Search Feature

As shown in FIG. 2, among the software modules 220 included on the device 201 is a search feature 221. The search feature 221 allows a user to quickly and easily locate and access a function or piece of information on the device.

In the example embodiment shown in FIG. 2, the search feature 221 is part of the operating system 222; however, in other example embodiments the search feature could be implemented as a stand-alone application 224 or software module 220.

Because the search feature 221 is intended to simplify the process of navigating the software environment of the device, in some example embodiments the means for launching the search feature is made relatively conspicuous. For instance, the search feature 221 may be launched in some example embodiments by selecting a GUI element that is available in many or all GUI contexts of the software environment of the device 201, such as a specific icon located (e.g. 710 of FIG. 7) in a consistent portion of the display 204. In some example embodiments, the device 201 may have one or more input mechanisms 260, such as a specific key or button, that consistently launches the search feature 221 regardless of the current GUI context. Other example embodiments may require two steps to activate the search function 221, such as opening a context menu in the GUI followed by selecting a "Search" option from the menu.

Figure 7:
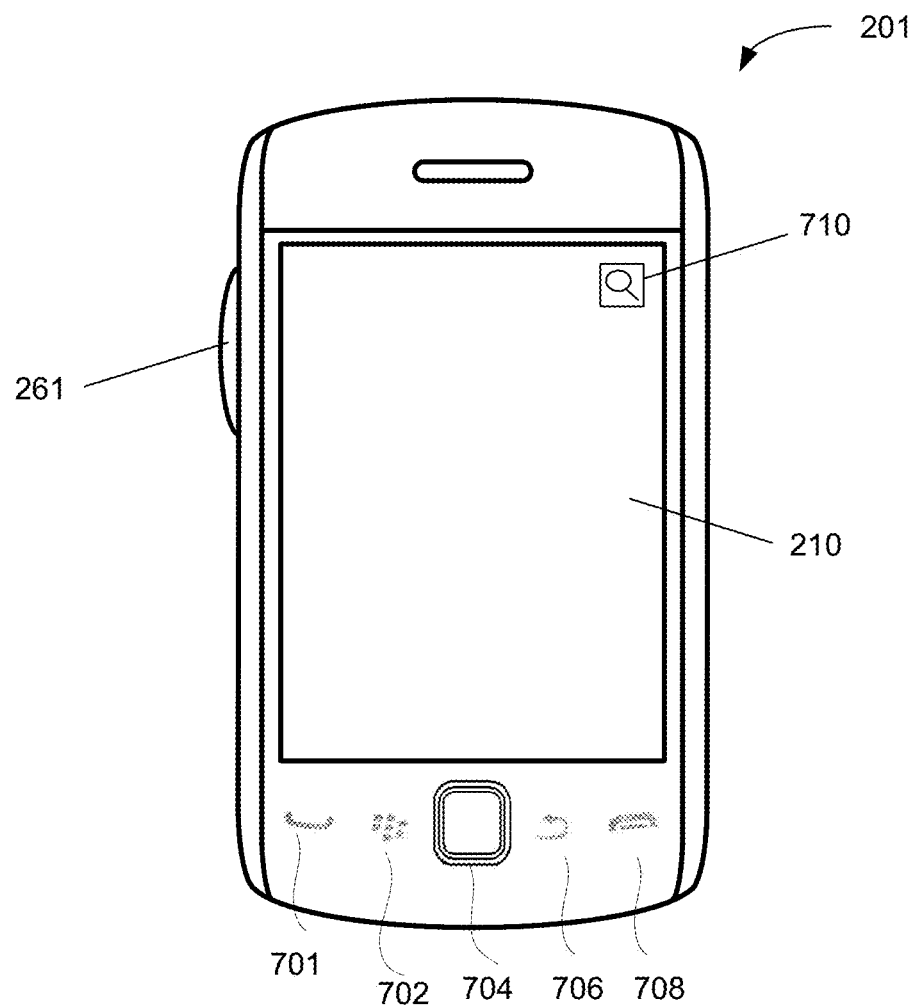
FIG. 7 is a front view of a mobile communication device in which example embodiments of the present disclosure can be applied.

An example mobile communication device 201 upon which example embodiments may be practiced is shown in a front view in FIG. 7. The device has a touchscreen display screen 204, which may display in one or more views of the GUI a search icon 710 or other GUI element for initiating the search feature 221, as described above. The device also has a dedicated search button 261 for initiating the search feature. It also has several other input mechanisms 260, such as a key for initiating a voice call 701, a key for displaying contextual menus 702, a key for ending voice calls 708, a key for cancelling or backing out of operations 706, and a multidirectional touchpad 704 for navigating a cursor on the touchscreen display screen 204 and selecting GUI elements thereon.

Figure 8:
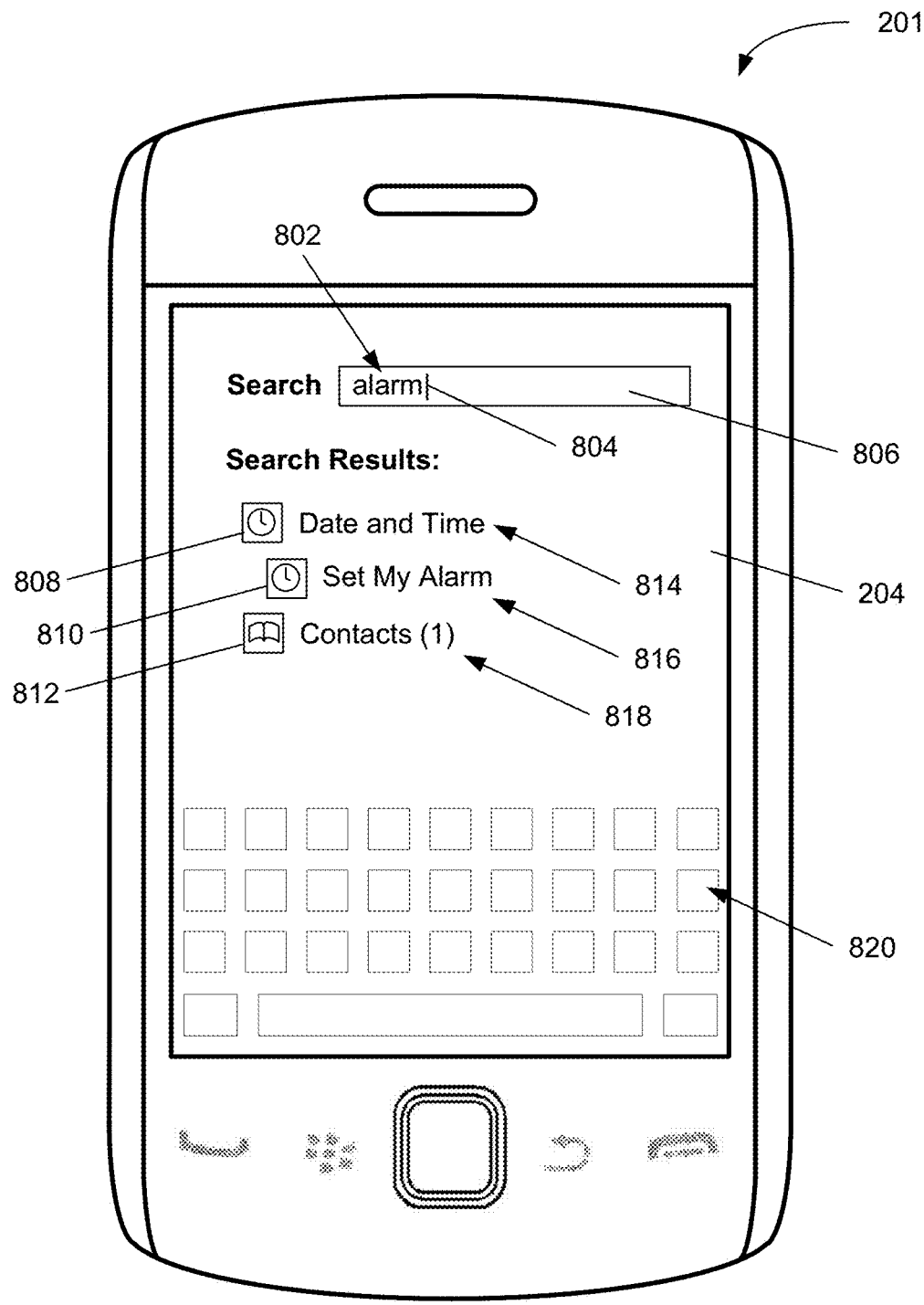
FIG. 8 is a front view of a mobile communication device showing a keyword search GUI screen in accordance with example embodiments of the present disclosure.

FIG. 8 shows an example user interface screen of the search feature 221 on the example mobile communication device 201 of FIG. 8. Several GUI elements are shown on the touchscreen display screen 204. A touchscreen keyboard 820 is displayed for allowing a user to enter text. A search text box 806 is displayed for showing the text being entered by the user for the search query. As the user enters the text 802 of the search query, a cursor 804 shows where in the text box 806 the GUI focus resides. When a search result is returned—either after the user is finished entering the search query or as the user types, as described above—a list of matches is returned as a search result. Shown at the top of the list is the clock icon 808 next to the display name "Date and Time" 814 corresponding to Object ID 0001 in FIG. 5. This item is matched to the search query text 802 "alarm" due to the keyword "Alarm" shown in FIG. 5 for Object ID 0001.

Second in the list is the clock icon 810 next to the display name "Set My Alarm" 816 corresponding to Object ID 0003 in FIG. 5. This is matched due to the matching title 506 "Set Alarm" and/or the matching keyword 512 "Alarm". This second item is shown indented relative to its parent module, Object ID 0001 (the clock application 227).

Third in the list is a set of matching results from the module-specific database of Object ID 0005 (the address book application 229 of FIG. 2). Since this item is listed in the central database 500 as having a module-specific database (i.e. the AppDB field 516 is set to "1"), the application 229 is instructed to perform a search of its contacts database 235 (of FIG. 2) for matching contact records 460. In the illustrated example, the address book application 229 searches all fields of contacts database 235 for matches to the search query. In the example contacts database 400 of FIG. 4, the only matching record is for Jeffrey Rosen, Contact ID 0001, due to his Street Address 410 of "600 Alarm Dr.". Thus, the group of matching contact records is shown in FIG. 8 as the address book icon 812 ("/ad.bmp" according to the example embodiment in FIG. 5) next to the display name "Contacts" 818 followed by the number of matching contact records 460 in parentheses, here "(1)".

Figure 9:
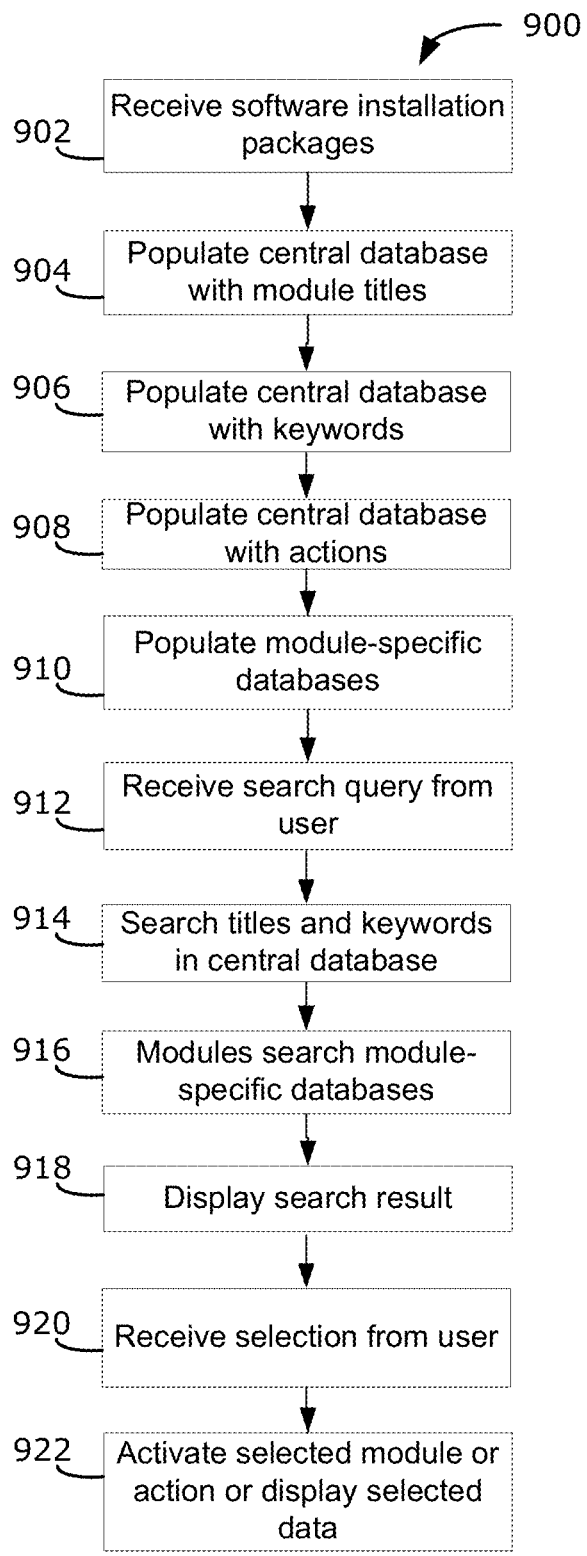
FIG. 9 is a flowchart illustrating a method for providing keyword searching on a communication device in accordance with example embodiments of the present disclosure.

The method of operation of the search feature 221 (of FIG. 2) according to an example embodiment is illustrated by the flowchart in FIG. 9. The search process 900 begins with the installation of more or more software modules 220 (of FIG. 2) from software installation packages 600 (of FIG. 6) as described above, at step 902. At step 904, the central database 500 (of FIG. 5) is populated with title metadata for the module from the software installation packages 600 as described above (e.g. the Title field 506). At step 906, the central database 500 is populated with keyword metadata for the module from the software installation packages 600 as described above (e.g. the Keywords field 512). At step 908, the central database 500 is populated with additional records for the module's actions 570 using metadata from the software installation packages 600 as described above (e.g. from the Actions table 614). At step 910, module-specific databases are populated by the software installation packages, or by the modules in use, as described above.

At step 912, the user initiates the search feature 221 through an input mechanism 260 (of FIG. 2) as described above, and provides a search query using an input mechanism 260. This interaction may take different forms in different example embodiments. In some example embodiments, activating the GUI element or input hardware element associated with the search feature will prompt the user to enter text using a text input mechanism 260 such as a touchscreen keyboard (e.g. 820 of FIG. 8), a keypad, voice input via a microphone using speech-recognition software, or some other mechanism for inputting text. The user uses this mechanism to enter text including the search query. In some example embodiments, the search feature 221 may perform searches in real-time as the user enters text, providing different sets of search results as the search query is expanded or edited by the user. In other example embodiments, the user may enter the full search query and provide input indicating that the search query is complete, after which the search feature 221 performs the search and provides the search results.

At step 914, the central database 500 and/or module-specific databases are searched for records matching the search query.

The matching algorithm used may be any of a number of algorithms known in the art. The matching algorithm may also in some example embodiments take into account the synonyms defined in a synonym table 528 (of FIG. 5): for example, some example embodiments may perform multiple rounds of matching, with the literal search query matched first, followed by the search query modified by substituting a root text string 524 present in the search query for its synonym 526 (or vice-versa). Multiple such rounds of matching may be performed if the search query contains multiple strings found in the synonym table 528 or multiple instances of such a string.

In some example embodiments, the search query is first matched against the Title field 506 in the central database 500, and matching records 560 identified. This is followed by matching against the Keywords field 512, with those records with Keywords 512 matching the search query being identified as well.

At step 916, some example embodiments pass the search query on to modules having module-specific databases to perform their module-specific searches. Where a module uses a module-specific database—indicated in the example embodiment of FIG. 5 by a value of "1" in the AppDB field 516—that module may receive instructions to perform a search using the search query (and/or synonymous versions of the search query as described above). Each module having a module-specific database may have its own procedures for conducting these searches, and the search results returned may take different forms for different modules. Alternatively, in some example embodiments module-specific databases may be searched by some software module other than the module with which they are affiliated. For example, in some example embodiments the message database 300 (of FIG. 3) may be searched by the operating system 222 (of FIG. 2) rather than the messaging application 228 (of FIG. 2).

At step 918, the search results from the central database 500 and/or the module-specific databases are communicated to the user. In the illustrated example embodiment in FIG. 8, this step includes displaying the search results on the device display screen 204 (of FIGS. 2, 7 and 8) as a list of display names 510 in text next to icons 520. Names 510 and icons 520 identify the software modules, actions and data records that are included in the search results. Other example embodiments may communicate the search results in other formats or through other output means, such as synthesized speech via an audio output. In addition, different example embodiments may display the results in a different format, such as displaying icons only, with a textual description only displayed when the icon is highlighted by a cursor or other user-controlled GUI selection indicator. Still other example embodiments may display text only without icons. In addition, the layout of the icons and/or textual descriptions may be a vertical list as in FIG. 8 or any other screen layout, such as a grid or a horizontal list.

Where a single module returns multiple items as part of the search result, these items may be grouped. For example, FIG. 8 shows the search query "alarm" returning one matching contact (indicated by "Contacts (1)") from the contacts database 400, namely the record shown in FIG. 4 with a street address 410 value of "600 Alarm Dr.". If multiple such contacts had been returned, the number in parentheses would have indicated the number of matches. In some example embodiments, this behaviour may be the same for all modules using a module-specific database, or it may be configured differently for different modules. It may also be applied to modules that do not use a module-specific database, by grouping multiple actions 570 with the same parent module 220 under a single listing for the parent module 220. Thus, if a search query matched two different actions 570 for the "Time and Date" module, the search result might list a single item "Time and Date (2)".

Where multiple such items are grouped together, the user may have to provide a further input to review the multiple grouped items. For example, a user of a touchscreen device might touch the list item showing multiple grouped matches to display a screen showing each matching item in a list format.

The display or communication of the search result may order the items returned as part of the search result in various ways. Some example embodiments may list matching modules first, followed by actions. Other example embodiments, such as the one illustrated in FIG. 8, may display each matching module followed immediately by its associated actions, with the actions indented relative to their parent modules. Matching items from the central database 500, i.e. modules and actions, may be displayed prior to matching items from module-specific databases. Items with matching Titles 506 may be displayed prior to items with matching Keywords 512. Where an item does not match the literal search query but only a synonymous version of the search query as described above with regard to the synonym table 528, the literal matches may be displayed prior to the synonym matches. Furthermore, where multiple matching items are grouped together as described above, the display of the grouped items in the subsequent screen may order the items according to one or more of the criteria noted above.

Returning to FIG. 9, the next step in the method is initiated when a user provides input selecting one of the items at step 920. As noted above, a user selecting a list item which groups several matches together may be shown a further list display of the grouped items. However, when a user selects a single item, either in the initial search result screen or the subsequent grouped item list screen, the item is activated at step 922. Where the item is a module 220, activation in some example embodiments may mean launching or running the module. In some example embodiments, this is accomplished by executing instructions as indicated, e.g., in the Link field 518 in the item's central database record. Thus, where one of the matching items is the Clock application 227 indicated by the Display Name 510 "Date and Time" and the Icon 520 (image "/clock.bmp") as shown in FIG. 8, this record may be selected by the user using a cursor, pointing device or touchscreen input in order to execute the Link 518 "/timedate.app", thereby opening the Clock application 227.

Similarly, where one of the matching items displayed in the search result is an action 570 of a module 220, selecting that action may execute instructions that launch the action's parent module and instruct it to perform the selected action. For example, selecting the "Set My Alarm" item in FIG. 8 would, in some example embodiments, execute the Link 518 "/timedate.app-setalarm", which would launch the clock application 227 and pass it the parameter "-setalarm", thereby causing it to display a GUI screen prompting the user to set an alarm within the application 227.

Where one of the selected items is a data record from a module-specific database, such as a contact record 460 from the contacts database 400, selecting the item from the search result may in some example embodiments cause the data record to be displayed to the user. This may be accomplished in some example embodiments by launching the module associated with the module-specific database and instructing it to display that data record. Thus, selecting the "Contacts (1)" search result item from the example search result in FIG. 8 would, in some example embodiments, first display a screen showing a list having only a single record (i.e. Contact ID 404 "0001" of FIG. 4). This single record would in some example embodiments display one or more pieces of information about the record 460, such as a first name 406 and last name 408 only. Upon selecting this single record, the user would then be shown a more complete view of the data record 460, including Street Address 410 and Email Address 412. Other example embodiments might eliminate the intermediate list screen for groups having only a single item, such as the example just described. Different example embodiments might have different information displayed as part of the list view and the more complete view of the data record 460.

The examples above of module-specific databases, namely the message database 300 and the contacts database 235, contain only information records, such as message records 360 and contact records 460. In some example embodiments, an application that has its own module-specific database may also have additional actions 570 stored in its module-specific database similar to the actions stored in the central database 500, and these actions 570 may be returned in a search result in the same manner as the central database actions.

Some example embodiments may associate one or more keywords with records in a module-specific database. Other example embodiments may perform a search within the module-specific database by comparing the search query to one or more values stored in the various data fields of the module-specific database, effectively treating these data fields as keyword fields. For example, a messaging application having a "AppDB" field value set to 1 (indicating that it does have a module-specific database used in keyword searches) using a module-specific database such as the one shown in FIG. 3 may perform a keyword search for data records in the database 300 by matching the search query to one or more fields such as Message Content, Sender, Recipients, Subject, Date/Time Received, and/or Date/Time Sent. Alternatively, or in addition, it may associate one or more separate keywords with one or more message data records 360 in its database 300 and match the search query against these keywords to identify matching data records 360.

The software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications. In some example embodiments, the software applications 224 include an instant messaging application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application.

In some example embodiments, the auxiliary input/output (I/O) subsystems 250 may include an external communication link or interface, for example, an Ethernet connection. The mobile communication device 201 may include other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may include a vibrator for providing vibratory notifications in response to various events on the mobile communication device 201 such as receipt of an electronic communication or incoming phone call, or for other purposes such as haptic feedback (touch feedback).

In some example embodiments, the mobile communication device 201 also includes a removable memory module 230 (typically including flash memory, such as a removable memory card) and a memory interface 232. Network access may be associated with a subscriber or user of the mobile communication device 201 via the memory module 230, which may be a Subscriber Identity Module (SIM) card for use in a GSM network or other type of memory card for use in the relevant wireless network type. The memory module 230 is inserted in or connected to the memory card interface 232 of the mobile communication device 201 in order to operate in conjunction with the wireless network 101.

The mobile communication device 201 stores data 242 in an erasable persistent memory, which in one example embodiment is the flash memory 244. In various example embodiments, the data 242 includes service data including information required by the mobile communication device 201 to establish and maintain communication with the wireless network 101. The data 242 may also include user application data such as email messages, contacts, calendar and schedule information, notepad documents, image files, and other commonly stored user information stored on the mobile communication device 201 by its user, and other data. The data 242 stored in the persistent memory (e.g. flash memory 244) of the mobile communication device 201 may be organized, at least partially, into a number of databases each containing data items of the same data type or associated with the same application. For example, email messages, contacts, and task items may be stored in individual databases within the mobile device memory.

In some example embodiments, the mobile communication device 201 is provided with a service routing API which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable or Bluetooth® connection to the host computer system for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including those described above, will normally be installed on the mobile communication device 201 during or after manufacture. Additional applications and/or upgrades to the operating system 222 or software applications 224 may also be loaded onto the mobile communication device 201 through the wireless network 101, the auxiliary I/O subsystem 250, the data port 252, the short-range communication subsystem 272, or other suitable subsystem 274 other wireless communication interfaces. The downloaded applications or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201. These additional applications may be installed in some example embodiments using software installation packages 600 as described above.

In accordance with further example embodiments of the present disclosure, there is provided a non-transitory computer readable storage medium having stored thereon computer executable instructions including instructions for practising the methods of the present disclosure. The computer executable instructions are configured to cause one or more processors to perform the methods described herein.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

FIG. 9 is a flowchart illustrating an example embodiment method (also referred to herein as a process). Some of the steps illustrated in the flowchart may be performed in an order other than that which is described. Also, it should be appreciated that not all of the steps described in the flow chart are required to be performed, that additional steps may be added, and that some of the illustrated steps may be substituted with other steps.

The example embodiments of the present disclosure described above are intended to be examples only. Those of skill in the art may effect alterations, modifications and variations to the particular example embodiments without departing from the intended scope of the present disclosure. In particular, features from one or more of the above-described example embodiments may be selected to create alternate example embodiments included of a sub-combination of features which may not be explicitly described above. In addition, features from one or more of the above-described example embodiments may be selected and combined to create alternate example embodiments included of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method performed by an electronic device, the method comprising:
installing a software module on the electronic device, the software module including a title and one or more keywords associated with the software module;
populating a database on the electronic device with the title associated with the software module and associating the title with the software module in the database;
associating the one or more keywords with the software module in the database;
receiving, at the electronic device, a search query;
determining that the search query matches either the title or one of the one or more keywords associated with the software module in the database; and
in response to determining that the search query matches either the title or the one or more keywords, displaying, at the electronic device, a search result identifying the software module.

2. The method of claim 1, wherein determining that the search query matches either the title or one or more keywords takes into account one or more synonyms of the search query, the title or the one or more keywords.

3. The method of claim 1, further comprising:
installing a further software module on the electronic device, the further software module including a title and one or more keywords associated with the further software module;
populating the database on the electronic device with the title associated with the further software module and associating the title with the further software module in the database;
associating the one or more keywords with the further software module in the database;
receiving, at the electronic device, a further search query;
determining if the further search query matches either the title or one of the one or more keywords associated with the software module in the database and determining if the further search query matches either the title or one of the one or more keywords associated with the further software module;
when the further search query matches either the title or the one or more keywords associated with the software module, displaying, at the electronic device, a search result identifying the software module; and
when the further search query matches either the title or the one or more keywords associated with the further software module, displaying, at the electronic device, a search result identifying the further software module.

4. The method of claim 1, wherein one or more of the keywords describe an operation associated with the software module.

5. The method of claim 1, wherein determining that the search query matches either the title or one of the one or more keywords associated with the software module in the database comprises:
performing a match against titles stored in the database; and
after performing the match against titles stored in the database, performing a match against keywords stored in the database.

6. The method of claim 1, further comprising:
in response to receiving, at the electronic device, a selection of the software module identified in the search result, activating the selected software module.

7. The method of claim 1, wherein:
the software module has one or more associated actions it is capable of performing;
at least one of the keywords is associated with at least one of the actions;
the search result displayed at the electronic device identifies at least one action having an associated keyword matching the search query.

8. The method of claim 7, further comprising:
receiving, at the electronic device, a selection, from the search result, of an action associated with the software module; and
instructing the software module associated with the selected action to perform the selected action.

9. The method of claim 8, wherein displaying, at the electronic device, the search result comprises:
displaying one or both of text or an icon representing each software module identified in the search result on a display of the electronic device; and
displaying one or both of text or an icon representing each action identified in the search result,
wherein the text or icon for each action identified in the search result is displayed in visual association with the text or icon for the software module associated with the action.

10. The method of claim 1, wherein the database is a central database providing search results for more than one software module.

11. An electronic device comprising:
a memory comprising a database;
an input device;
an output device; and
a processor coupled with the memory, the output device and the input device, the processor configured to:
install a software module on the electronic device, the software module including a title and one or more keywords associated with the software module;
populate the database with the title associated with the software module and associating the title with the software module in the database;
associate the one or more keywords with the software module in the database;
receive a search query via the input device;
determine that the search query matches either the title or one of the one or more keywords associated with the software module in the database; and
in response to determining that the search query matches either the title or the one or more keywords, output via the output device a search result identifying the software module.

12. The electronic device of claim 11, wherein determining that the search query matches either the title or one or more keywords takes into account one or more synonyms of the search query, the title or the one or more keywords.

13. The electronic device of claim 11, wherein the processor is further configures to:
install a further software module on the electronic device, the further software module including a title and one or more keywords associated with the further software module;
populate the database on the device with the title associated with the further software module and associating the title with the further software module in the database;
associate the one or more keywords with the further software module in the database;
receive, at the electronic device, a further search query;
determine if the further search query matches either the title or one of the one or more keywords associated with the software module in the database and determining if the further search query matches either the title or one of the one or more keywords associated with the further software module;
when the further search query matches either the title or the one or more keywords associated with the software module, outputting a search result identifying the software module; and
when the further search query matches either the title or the one or more keywords associated with the further software module, outputting a search result identifying the further software module.

14. The electronic device of claim 11, wherein one or more of the keywords describe an operation associated with the software module.

15. The electronic device of claim 11, wherein determining that the search query matches either the title or one of the one or more keywords associated with the software module in the database comprises:
performing a match against titles stored in the database; and after performing the match against titles stored in the database, performing a match against keywords stored in the database.

16. The electronic device of claim 11, wherein the processor is further configured to:
in response to receiving, at the electronic device, a selection of the software module identified in the search result, activate the selected software module.

17. The electronic device of claim 11, wherein:
the software module has one or more associated actions it is capable of performing;
at least one of the keywords is associated with at least one of the actions;
the search result output identifies at least one action having an associated keyword matching the search query.

18. The electronic device of claim 17, wherein the processor is further configured to:
receive, at the electronic device, a selection, from the search result, of an action associated with the software module; and
instruct the software module associated with the selected action to perform the selected action.

19. The electronic device of claim 18, wherein outputting the search result comprises:
displaying one or both of text or an icon representing each software module identified in the search result on a display of the device; and
displaying one or both of text or an icon representing each action identified in the search result,
wherein the text or icon for each action identified in the search result is displayed in visual association with the text or icon for the software module associated with the action.

20. A non-transitory computer readable storage medium having stored thereon instructions configuring an electronic device to:
install a software module on the electronic device, the software module including a title and one or more keywords associated with the software module;
populate a database on the electronic device with the title associated with the software module and associating the title with the software module in the database;
associate the one or more keywords with the software module in the database;
receive, at the electronic device, a search query;
determine that the search query matches either the title or one of the one or more keywords associated with the software module in the database; and
in response to determining that the search query matches either the title or the one or more keywords, display, at the electronic device, a search result identifying the software module.

* * * * *